United States Patent
McNelis et al.

[15] 3,650,907
[45] Mar. 21, 1972

[54] METHOD OF SEPARATING 2,6-NAPHTHALIC ACID FROM 6-FORMYL-2-NAPHTHOIC ACID

[72] Inventors: Edward J. McNelis, New Rochelle, N.Y.; Wesley R. Cherry, Prospect Park, Pa.

[73] Assignee: Sun Oil Company, Philadelphia, Pa.

[22] Filed: Apr. 23, 1969

[21] Appl. No.: 818,815

[52] U.S. Cl. ..................203/96, 260/469, 260/524 R, 260/524 N, 260/525
[51] Int. Cl. ................B01d 3/38, C07c 67/06, C07c 69/76
[58] Field of Search................260/475 B, 475 FR, 469, 525, 260/524; 203/95, 96

[56] References Cited

UNITED STATES PATENTS

| | | | |
|---|---|---|---|
| 3,425,915 | 2/1969 | Roberts et al. | 260/475 B |
| 3,382,271 | 5/1968 | McNerney | 260/475 B |
| 3,227,752 | 1/1966 | Olivier et al. | 260/524 N |
| 2,906,774 | 9/1959 | Raecke et al. | 260/525 |
| 2,778,849 | 1/1957 | Ackelsberg | 260/475 R |
| 2,653,165 | 9/1953 | Levine | 260/524 |
| 1,815,985 | 7/1931 | Pansegrow | 260/524 |

FOREIGN PATENTS OR APPLICATIONS

| | | | |
|---|---|---|---|
| 1,125,417 | 3/1962 | Germany | 260/475 B |
| 1,043,289 | 9/1966 | Great Britain | 260/475 B |

OTHER PUBLICATIONS

Laboratory Technique in Organic Chemistry Avery Morton 1938 p. 143 QD261M74C5
Laboratory Technique in Organic Chemistry Kenneth Wiberg 1960, pp. 71– 74
Practical Organic Chemistry Arthur I. Vogel Third Edition 1956, pp. 12– 13, 15 QD251V6C3

*Primary Examiner*—Lorraine A. Weinberger
*Assistant Examiner*—Jacqueline L. Davison
*Attorney*—George L. Church, Donald R. Johnson, Wilmer E. McCorquodale, Jr. and Stanford M. Back

[57] ABSTRACT

Mixtures of 6-formyl-2-naphthoic acid and 2,6-naphthalic acid formed from the oxidation of 2,6-dimethylnaphthalene are readily separable by the steam distillation of their esters. This method has a further advantage in that it removes trace amounts of color bodies from the aldehyde ester.

4 Claims, No Drawings

METHOD OF SEPARATING 2,6-NAPHTHALIC ACID FROM 6-FORMYL-2-NAPHTHOIC ACID

BACKGROUND OF THE INVENTION

This invention relates to a process for the separation of 6-formyl-2-naphthoic acid from 2,6-naphthalic acid. More particularly, this invention relates to the separation of the lower alkyl esters of 6-formyl-2-naphthoic acid and 2,6-naphthalic acid by steam distillation.

Mixtures of 6-formyl-2-naphthoic acid and 2,6-naphthalic acid are frequently formed during the oxidation of 2,6-dimethylnaphthalene. Although the desired end product of this oxidation is 2,6-naphthalic acid, substantial amounts of the intermediate 6-formyl-2-naphthoic acid are often formed. Since it is necessary to separate out the 6-formyl compound in order to both purify the 2,6-naphthalic acid and to recycle the 6-formyl intermediate for further oxidation, a clean and simple method for separating these two compounds has been sought. Unfortunately, however, because of the solubility of the 6-formyl compound and its other chemical characteristics, conventional techniques such as fractional distillation have proved difficult and unsatisfactory. Moreover, although selective crystallization of the diacid ester in alcohol has likewise been employed, this method at best merely provides recovery of just the 2,6-naphthalic acid, thus making it necessary to utilize other techniques for recovering the 6-formyl-2-naphthoic acid.

SUMMARY OF THE INVENTION

In accordance with the present invention, it has now been found that 6-formyl-2-naphthoic acid (hereinafter "aldacid") may be cleanly separated from 2,6-naphthlic acid (hereinafter "diacid") by the steam distillation of their corresponding lower alkyl esters whereby pure crystals of the aldacid compound may be recovered from the condensate, leaving behind the diacid ester in substantially pure form. This method thus has not only the advantage of providing both of the compounds in separate and pure form, but it also has the added advantage of providing the aldacid ester in a form which is free from trace amounts of color bodies, which purity has not heretofore been possible by the prior art methods.

DESCRIPTION OF THE INVENTION

The mixture of the aldacid and diacid may result from a variety of processes. One such mixture to which the present method is particularly applicable is that resulting from the oxidation of 2,6-dimethylnaphthalene with $NO_2$, either with or without a selenium dioxide catalyst, whereby a mixture of the aldacid and diacid are produced, often in equal amounts. It should be understood, however, that neither the source of the mixture nor the ratio of aldacid to diacid is critical to the success of the present method.

It is necessary that the diacid and aldacid be converted to their corresponding lower alkyl esters prior to the steam distillation. This is conveniently achieved by treating the aforesaid mixture with a suitable esterifying agent, preferably an alkanol having from one to five carbon atoms, and most preferably methanol. The reaction may readily be carried out in a steel or glass-lined bomb at an elevated temperature of from about 130° to 175° C.

Following removal of the excess alcohol and drying of the mixture, water is then added to the diacid and aldacid esters and the mixture heated until steam is generated in situ, thereby accomplishing the steam distillation. Alternatively, steam may be introduced into the mixture from an outside source. The amount of water or steam employed is not critical; however, it is desirable that an excess of water or steam be maintained throughout the distillation. The rate of recovery of the aldacid ester may be increased, if necessary, by the use of superheated steam.

Recovery of the diacid ester may conveniently be achieved by carrying out the steam distillation to extinction; the residue will then be substantially pure diacid ester. Similarly, collecting and drying the condensate will yield the aldacid ester in substantially pure form.

The invention will now be further illustrated by the following example.

EXAMPLE I

A mixture comprising 1.22 g. of dimethyl 2,6-naphthalate and 0.214 g. of methyl 6-formyl-2-naphthoate was mixed with 200 ml. of water. The mixture was seam distilled by the in situ method. Water was replenished as needed.

After 500 ml. of condensate the distillation was stopped, and 62 mg. of white crystals were collected from the distillate and dried. Their IR matched that of authentic aldacid methyl ester. They melted at 125–7° C. without crystallization (reported 129–30° C.).

When the foregoing separation was carried out with superheated steam, the same results were observed, although at an increased distillation rate.

What is claimed is:

1. A method for the separation of a lower alkyl ester of 6-formyl-2-naphthoic acid from a lower alkyl ester of 2,6-naphthalic acid which comprises steam distilling a mixture of said esters and recovering said ester of 6-formyl-2-naphthoic acid from the resulting condensate.

2. The process according to claim 1 wherein the steam is formed in situ.

3. The process according to claim 1 wherein the steam is introduced from an outside source.

4. The process according to claim 3 wherein the steam is superheated steam.

* * * * *